US010445996B2

(12) United States Patent
Alghooneh et al.

(10) Patent No.: US 10,445,996 B2
(45) Date of Patent: *Oct. 15, 2019

(54) INERTIAL HAPTIC ACTUATORS HAVING A CANTILEVERED BEAM AND A SMART MATERIAL

(71) Applicant: Immersion Corporation, San Jose, CA (US)

(72) Inventors: Mansoor Alghooneh, Toronto (CA); Vahid Khoshkava, Laval (CA); Juan Manuel Cruz Hernandez, Westmount (CA); Neil Olien, Montreal (CA); Robert A. Lacroix, Saint-Lambert (CA)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/017,475

(22) Filed: Jun. 25, 2018

(65) Prior Publication Data
US 2018/0374321 A1     Dec. 27, 2018

Related U.S. Application Data

(63) Continuation of application No. 15/395,726, filed on Dec. 30, 2016, now Pat. No. 10,019,875.

(51) Int. Cl.
| | | |
|---|---|---|
| *G08B 6/00* | (2006.01) | |
| *B06B 1/06* | (2006.01) | |
| *G06F 3/01* | (2006.01) | |
| *G06F 1/16* | (2006.01) | |
| *G06F 3/041* | (2006.01) | |
| *G06F 3/0354* | (2013.01) | |
| *B06B 1/04* | (2006.01) | |

(52) U.S. Cl.
CPC .................. *G08B 6/00* (2013.01); *B06B 1/06* (2013.01); *G06F 1/1637* (2013.01); *G06F 1/1643* (2013.01); *G06F 1/1656* (2013.01); *G06F 3/016* (2013.01); *G06F 3/03547* (2013.01); *G06F 3/041* (2013.01); *B06B 1/045* (2013.01); *B06B 2201/52* (2013.01); *B06B 2201/55* (2013.01)

(58) Field of Classification Search
CPC .... G06F 1/1637; G06F 1/1643; G06F 1/1646; G06F 3/016; G06F 3/03547; G06F 3/041; B06B 1/06; B06B 1/045; B06B 2201/52; B06B 2201/55; G08B 6/00
See application file for complete search history.

(56) References Cited

U.S. PATENT DOCUMENTS

| | | | |
|---|---|---|---|
| 5,245,245 A | 9/1993 | Goldenberg | |
| 6,078,126 A | 6/2000 | Rollins et al. | |
| 6,629,341 B2 | 10/2003 | Wilkie et al. | |
| 8,405,618 B2 | 3/2013 | Colgate et al. | |
| 8,890,666 B2 | 11/2014 | Parker et al. | |
| 10,019,875 B1 * | 7/2018 | Alghooneh | B06B 1/06 |

(Continued)

*Primary Examiner* — Leon Flores
(74) *Attorney, Agent, or Firm* — Miles & Stockbridge P.C.

(57) ABSTRACT

A haptic actuator comprising a base and a haptic transducer at least partially suspended by the base. The haptic transducer comprises a substrate and a smart material operably connected to the substrate. The smart material has resonance in response to an electrical signal having a determined frequency, and the resonance causes the haptic transducer to vibrate and deliver a haptic effect.

20 Claims, 7 Drawing Sheets

(56) References Cited

U.S. PATENT DOCUMENTS

2009/0250267 A1 10/2009 Heubel et al.
2010/0090814 A1 4/2010 Cybart et al.
2014/0247227 A1 9/2014 Jiang et al.

* cited by examiner

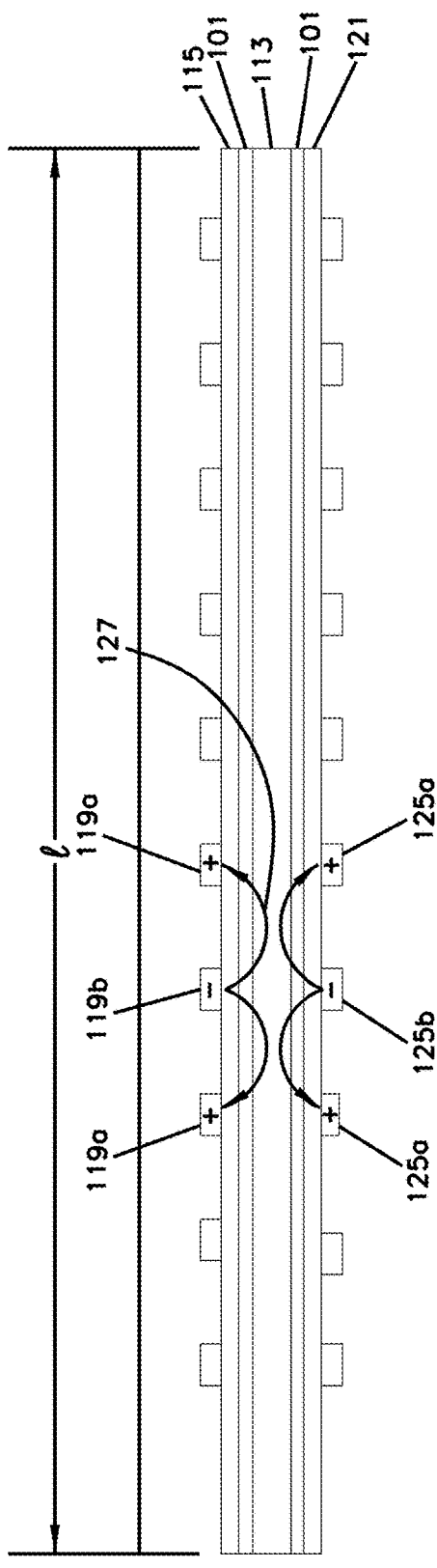
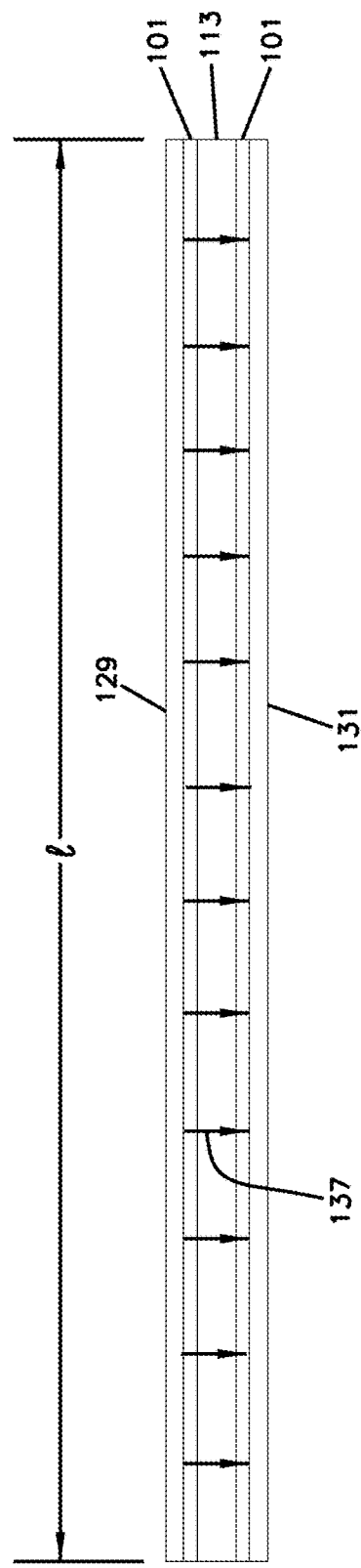

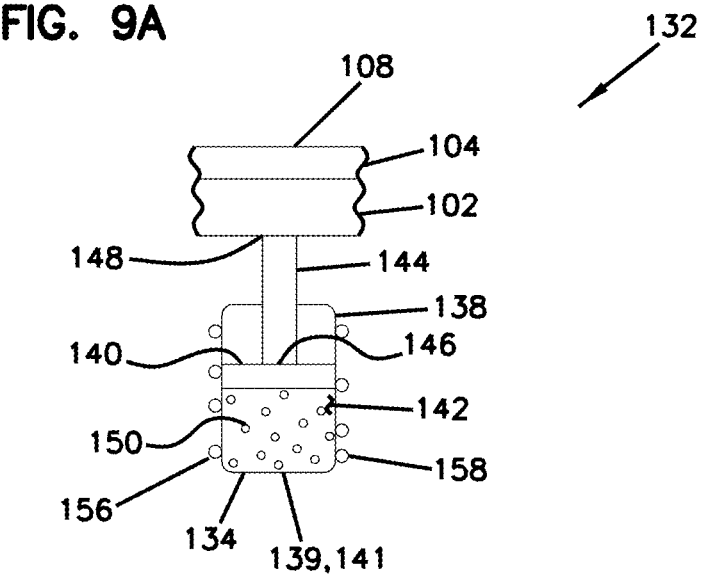
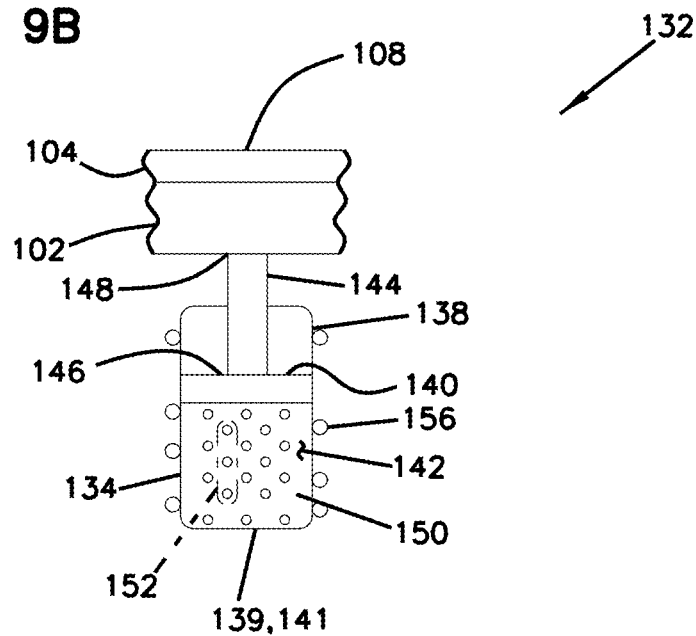

INERTIAL HAPTIC ACTUATORS HAVING A CANTILEVERED BEAM AND A SMART MATERIAL

PRIORITY APPLICATION

This application is a continuation of U.S. patent application Ser. No. 15/395,726, filed on Dec. 30, 2016, which has been incorporated herein by reference in its entirety.

TECHNICAL FIELD

In general terms, this patent document relates to haptic actuators, and more particularly to inertial haptic actuators having a cantilevered beam and a smart material.

BACKGROUND

Linear resonant haptic actuators are used in a variety of applications including many different types of portable electronic devices. These actuators are commonly piezo benders, which are suspended beams that have a layer formed by a piezoelectric transducer. Applying a voltage to the piezoelectric transducer causes the transducer to vibrate, which in turn vibrates the beam to deliver the haptic effect. These types of haptic actuators deliver crisp performance, but the transducers typically include ceramic and are fragile. A sharp impact from being dropped or banged against something commonly causes the transducer to break, which makes the haptic actuator unable to work and deliver haptic effects.

SUMMARY

One aspect of this patent document is a haptic actuator comprising a base and a haptic transducer at least partially suspended by the base. The haptic transducer has a substrate and a smart material component supported by the substrate. The smart material component has smart material, and the smart material is encapsulated. The haptic transducer has resonance in response to an electrical signal having a determined frequency, and the resonance causes the haptic transducer to vibrate and deliver a haptic effect.

Another aspect is an apparatus having a haptic actuator. The apparatus comprises a housing, a controller positioned in the housing, and a haptic actuator positioned and at least partially cantilevered within the housing. The haptic actuator is electrically connected to the controller and has a substrate and a smart material component supported by the substrate. The smart material component has smart material, and the smart material is encapsulated. The haptic transducer has resonance in response to an electrical signal having a determined frequency. The resonance causing the haptic transducer and the housing to vibrate to deliver a haptic effect.

Another aspect is a method of generating a haptic effect. The method comprises applying an electrical signal to an encapsulated smart material; vibrating a substrate in response to applying the electrical signal; and delivering a haptic effect in response to vibrating the substrate.

BRIEF DESCRIPTION OF THE DRAWINGS

FIG. 3B is a side view of the smart material fabrication illustrated in FIG. 3A, taken along line 3B-3B.
FIG. 4B is a side view of the alternative smart material fabrication illustrated in FIG. 4A, taken along line 4B-4B.
FIGS. 9A and 9B illustrate bases shown in FIG. 8 in greater detail.

DETAILED DESCRIPTION

Figure 1:
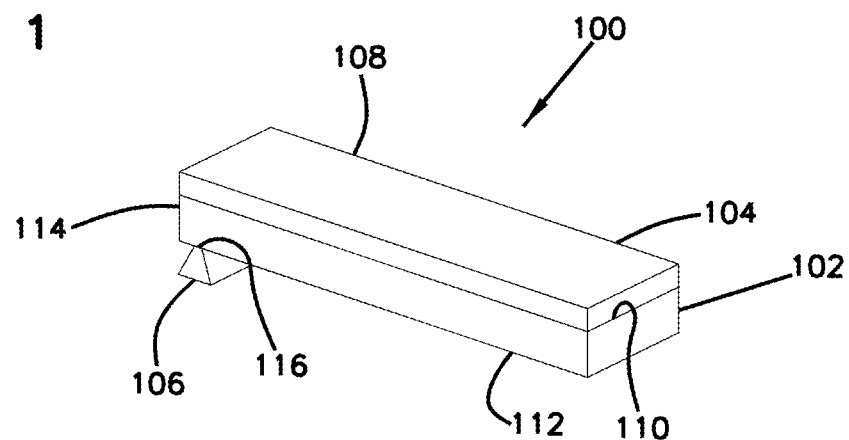
FIG. 1 is a top isometric view of a haptic actuator.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," "including," "has," and "having" are interchangeable and not intended to be limiting. The term "such as" also is not intended to be limiting. For example, the term "including" shall mean "including, but not limited to."

In general terms, this patent document relates to inertial or linear resonant haptic actuators having a durable and shock-resistant bender formed with a cantilevered beam. The cantilevered beam has a substrate and a smart material assembly, which bends when stimulated by an external stimulus such as an electrical signal, electric field, or magnetic field temperature to generate a haptic effect for delivery to a user. This patent document also relates to structures for suspending the cantilevered beam that provide controlled damping to enable more accurate tuning of the beam's resonant frequency.

Relative to traditional piezoelectric benders, haptic actuators using the benders disclosed herein are significantly more shock resistant and durable. Thus, manufacturers of electronic devices that use benders for haptic actuators do not need to artificially limit travel of the beams or otherwise dampen movement of the beams to prevent breakage. Nor do manufacturers need to make thicker, shorter, or wider cantilevered beams to increase durability or shock-resistance. The manufacturers can then design and implement haptic actuators that generate significant acceleration, flexure, and displacement when vibrating to deliver stronger and a greater variety of haptic effects. Also, they can design haptic actuators that require relatively less power consumption. The cantilevered beams and suspensions disclosed herein also provide greater flexibility when tuning the haptic actuator to a desired resonant frequency.

A haptic effect can be any type of tactile sensation delivered to a person. In some embodiments, the haptic effect embodies information such as a cue, notification, feedback or confirmation of a user's interaction with a haptic-enabled article or other notifications. In some embodiments, the haptic effect can embody a more complex message or other information. In alternative embodiments, the haptic effect can be used to enhance a user's interaction with a device by simulating a physical property or effect such as friction, flow, and detents.

Figure 2:
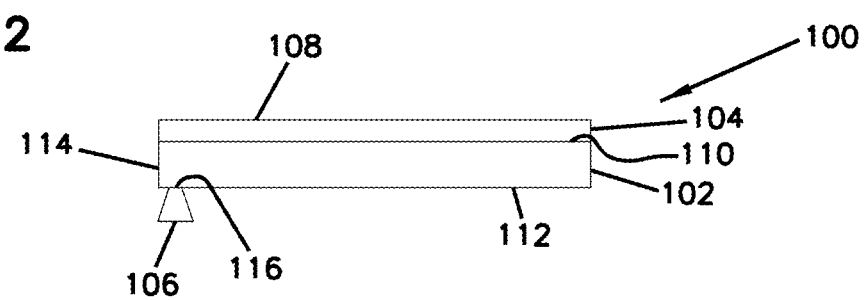
FIG. 2 is a side view of the haptic actuator illustrated in FIG. 1.

Referring now to FIGS. 1 and 2, an exemplary embodiment of a linear resonant haptic actuator 100 has a substrate 102, a smart material fabrication 104 layered along a surface of the substrate 102, and a base or support 106 that supports the substrate 102. The substrate 102 and smart material fabrication 104 form a beam 108 structure that is supported by and cantilevered off the base 106. In at least one embodiment, and as disclosed in more detail herein, the smart material fabrication 104 includes a smart material and at least a pair of electrodes that receive an electrical signal and generate an electric field that is applied to the smart material. In alternative embodiments the smart material fabrication 104 can be placed along the bottom surface of the substrate 102, or the haptic actuator could include two smart material fabrications with one positioned along one surface of the substrate and the other positioned along the oppositely disposed surface of the substrate 102.

Figure 3A:
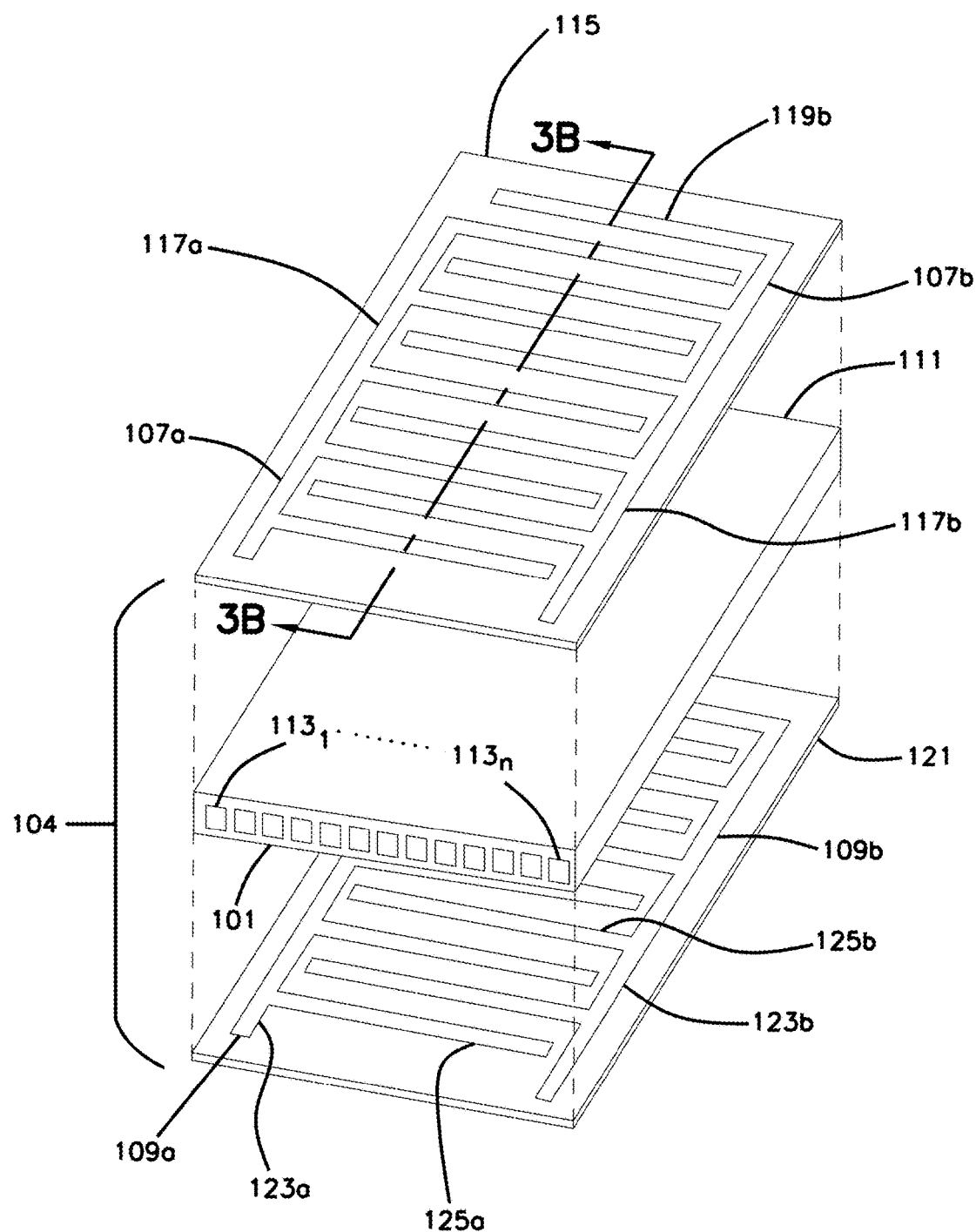
FIG. 3A is an exploded isometric view of a smart material fabrication for the haptic actuator illustrated in FIGS. 1 and 2.

Alternative embodiments of the smart material fabrication 104 can have various embodiments. Referring now to FIGS. 3A and 3B, for example, a possible embodiment of the smart material fabrication 104 is a macro fiber composite (MFC) having a first set of electrodes 107a and 107b, a second set of electrodes 109a and 109b, and a smart material component 111 between the first and second set of electrodes. The smart material component 111 has a plurality of macro fibers $113_1$-$113_n$ or other types of elongated members. In at least some embodiments, the macro fibers $113_1$-$113_n$ run parallel to one another and are arranged so they lay on the same plane when in a non-stimulated or relaxed state and thus are not bent. The macro fibers $113_1$-$113_n$ have a length that runs substantially from one end of the electrodes 107a, 107b and 109a, 109b to the other end of the electrodes. Additionally, the macro fibers $113_1$-$113_n$ have a cross section relative to their length, l, that is substantially square or rectangular. The blocking force generated by the smart material when it is exposed to an electrical field is defined by equation 1:

$$F_{max}=(E^*A\Delta L)/l \quad (1)$$

where $F_{max}$ is the blocking force of the macro fibers, $E^*$ is the effective modulus of elasticity for the macro fibers, A is the cross sectional area of the macro fibers, $\Delta L$ is the displacement for the macro fibers, and l is the length of the macro fibers. An advantage of maximizing the length and cross-sectional area of the macro fibers $113_1$-$113_n$ is that when they are exposed to a given electric field, the blocking force and magnitude of displacement for the macro fibers is maximized. Alternative embodiments, however, have different configurations for the macro fibers $113_1$-$113_n$. For example, the cross-sectional area can be circular, oval, or any other shape that is not rectangular. Additionally, the length, l, of the macro fibers $113_1$-$113_n$ can be longer or shorter than the length of the electrodes 107a, 107b and 109a, 109b. Additionally, each macro fiber $113_1$-$113_n$ can be a solid smart material structure such as a solid piezoceramic or other smart material. Alternatively, the macro fibers $113_1$-$113_n$ can include layers of smart material with layers of an alternative material such as an electrode between adjacent layers of smart material. For example, a bimorph macro fiber might include two layers of a piezoceramic or other smart material with an electrode between each layer of smart material. Other embodiment could include more than two layers of smart material.

Although the smart material component is illustrated as having 13 macro fibers $113_1$-$113_n$, alternative embodiments can have different numbers of macro fibers $113_1$-$113_n$. Additionally, although macro fibers are discussed herein, the smart material can have alternative structures such as microfibers or possibly even be on a nanometer scale. Other examples of structures for the smart material include a plurality of rods, planer panels, and slats that are substantially wider than they are thick.

The macro fibers $113_1$-$113_n$ are encapsulated 101 in an epoxy or other material to form a macro fiber composite (MFC) that is flexible and permits the macro fibers to bend. An example of an epoxy that can be used to encapsulate the elongated rods includes Loctite™ brand epoxy EA-120HP. Other epoxies and materials, including epoxies and materials having a low level of damping and high stiffness, can be used to encapsulate the macro fibers $113_1$-$113_n$. Additionally, the macro fibers $113_1$-$113_n$ can be encapsulated by a variety of different techniques. For example, the macro fibers $113_1$-$113_n$ can be molded into the epoxy. In an alternative embodiment, the epoxy is printed using 3D printing techniques. In yet other embodiments, the macro fibers $113_1$-$113_n$ are deposited on a protective substrate such as a polyimide film, an epoxy is added between the macro fibers, and then another protective substrate such as another polyimide film is layered over the top of the fibers. In yet other embodiments, the macro fibers $113_1$-$113_n$ are positioned directly against the second set of electrodes 109a and 109b or the substrate 102 and then the encapsulation material is formed around the macro fibers $113_1$-$113_n$ so that it extends from the surface of the substrate 102 and then up and over the macro fibers $113_1$-$113_n$. In this embodiment, the substrate 102 forms part of the encapsulation 101.

Having a plurality of macro fibers $113_1$-$113_n$ instead of a single unit of smart material and then encapsulating 101 the macro fibers $113_1$-$113_n$ provides durability to the haptic actuator 100. For example, if a macro fiber $113_1$-$113_n$ cracks, the crack is isolated to the one macro fiber $113_1$-$113_n$ and does not spread to the other macro fibers $113_1$-$113_n$, which remain intact and fully operational. Additionally, the epoxy will hold the cracked macro fiber $113_1$-$113_n$ together so that it may continue to bend and function when exposed to an electric field, even if the blocking force might be reduced for the cracked macro fiber $113_1$-$113_n$. This structure enables the use of even ceramic-based piezoelectric material to form the macro fibers $113_1$-$113_n$ and still provide a high level of durability and reliability when compared to traditional haptic benders that use ceramic-based piezoelectric material.

Each electrode 107a and 107b in the first set of electrodes is mounted on a first film 115 and has a main lead or trace 117a and 117b, respectively, that extends along the length of the smart material component 111. A plurality of electrode fingers 119a and 119b, respectively, extends from the main leads 117a and 117b, respectively, and are orthogonal or 90° to the macro fibers $113_1$-$113_n$. The electrodes 107a and 107b in the first set of electrodes are opposing and the electrode fingers 119a and 119b from the first and second electrodes 107a and 107b, respectively, alternate and extend toward the trace of the opposing electrode 107b and 107a, respectively, so that the electrode fingers are interdigitated. The second set of electrodes 109a and 109b is mounted on a second film 121 and are substantially similar to the first and second electrodes 107a and 107b and also have main leads 123a and 123b, respectively, and interdigitated electrode fingers 125a and 125b, respectively. In at least some embodiments, the electrode fingers 119a and 119b for the first set of electrodes 107a and 107b oppose the electrode fingers 125a and 125b, respectively, for the second set of electrodes 109a and 109b.

Additionally, although the electrode fingers 119a and 119b are illustrated as being orthogonal to the macro fibers $113_1$-$113_n$, the electrode fingers and macro fibers have an angular orientation relative to each other than 90° so long as the electric field flowing between the electrode fingers 119a and 119b have a vector that flows or radiates along the length, l, of the macro fibers.

In operation, the first and second sets of electrodes 107a, 107b and 109a, 109b can be energized in at least two possible combinations. Still referring to FIG. 3B, for example, the first electrode 107a and 109a in each set of electrodes can be energized with an electric signal having one polarity and the second electrode 107b and 109b in each set of electrodes can be energized with and electrical signal 180° out-of-phase with the first signal or with the opposite polarity. In this embodiment, an electric field 127 directed from each electrode finger in the electrode pair having a negative polarity to the adjacent electrode fingers in the electrode pair which have a positive polarity. If the haptic drive signal oscillates, the polarity of the first and second electrodes will alternatingly shift between positive and negative. Alternative embodiments will energize the electrodes 107a, 107b and 109a, 109b in each set of electrodes with signals that have a phase shift other than 180°, but are still out-of-phase relative to each other. For example, electrodes 107a will have a positive polarity while electrode 107b has a negative polarity.

Figure 4A:
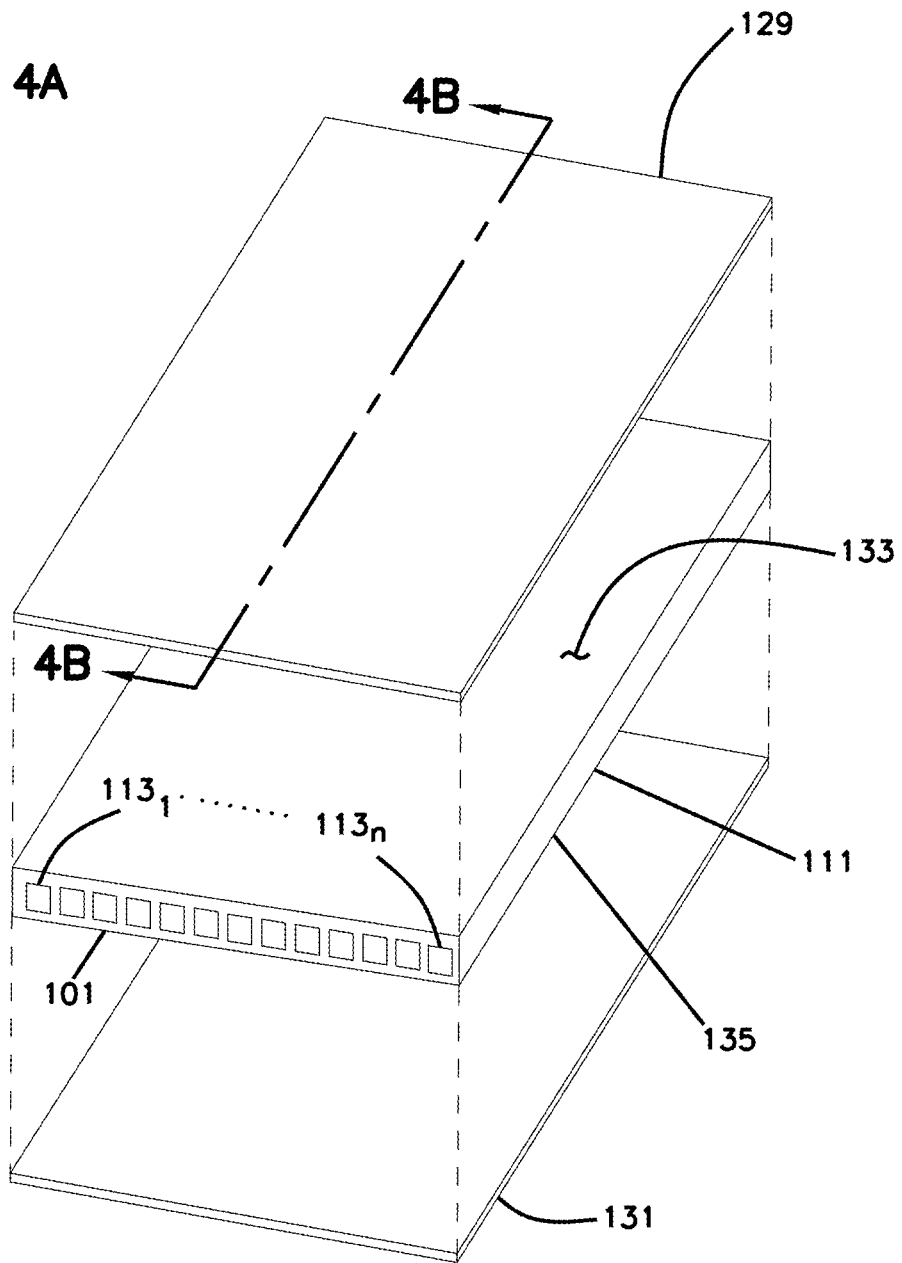
FIG. 4A is an exploded isometric view of an alternative embodiment of a smart material fabrication for the haptic actuator illustrated in FIGS. 1 and 2.

FIGS. 4A and 4B illustrates an alternative embodiment of a smart material fabrication 105. This embodiment is substantially similar to the smart material fabrication 105 illustrated in FIGS. 3A and 3B, and includes the smart material component 111 positioned between first and second electrodes 129 and 131. The smart material component 111 is similar to the smart material component illustrated in FIGS. 3A and 3B and comprises a plurality of macro fibers $113_1$-$113_n$ or similar elongated members that are encapsulated 101. The smart material component 111 has first and second opposing surfaces 133 and 135.

The first and second electrodes 129 and 131 are coextensive with the first and second opposing surface 133 and 135 of the smart material component 111. In an exemplary embodiment, the second electrode 131 is positioned or layered between the smart material component 111 and the substrate 102. In an alternative embodiment, the substrate 120 is formed with an electrically conductive material and functions as the second electrode. In operation, a haptic drive signal is applied to the first and second electrodes 129 and 131 with the haptic drive signal having one phase applied to the first electrode 129 and the haptic drive signal being inverted so its phase is shifted 180° before it is applied to the second electrode 131. In this way, the first and second electrodes 129 and 131 will have an opposite polarity. If the haptic drive signal oscillates, the polarity of the first and second electrodes will alternatingly shift between positive and negative. Alternative embodiments will energize the electrodes 107a, 107b and 109a, 109b in each set of electrodes with signals that have a phase shift other than 180°, but are still out-of-phase relative to each other. For example, electrodes 107a will have a positive polarity while electrode 107b has a negative polarity.

In this configuration, the first and second electrodes 129 and 131 generate an electric field 137 that passes between the first and second electrodes 129 and 131 and through the macro fibers $113_1$-$113_n$ in the smart material component 111 in a direction orthogonal to the length, l, of the macro fibers. In an exemplary embodiment, the haptic drive signal is applied to the first and second electrodes 129 and 131 so that the electric field 137 passing between the first and second electrodes 129 and 131 and through the smart material component 111 is substantially uniform. Alternative embodiments apply the haptic drive signal to the first and second electrodes 129 and 131 such that the electrodes 129 and 131 generate an electric field that has a gradient or changing amplitude along the length, l, of the macro fibers $113_1$-$113_n$ such that one portion along the length of the of the macro fibers $113_1$-$113_n$ has a different blocking force than a different portion of the length of the macro fibers $113_1$-$113_n$.

Although the first and second electrodes 129 and 131 are illustrated as being rectangular and co-extensive with the surfaces of the smart material component 111, alternative embodiments can have electrodes having different shapes and different sizes relative to the surface of the smart material component 111. Additionally, each electrode 129 and 131 can have separate segments that each receive a separate signal from the actuator drive signal. In these embodiments, the segments for each electrode 129 and 131 are connected to the haptic actuators controller such that electrode segments on one side of the smart material component 111 will have one polarity and electrode segments on the opposite side of the smart material component 111 will have the opposite polarity. Having separate electrode segments enables haptic drive signals of different amplitudes to be applied along the length, l, of the macro fibers $113_1$-$113_n$, which enables the amplitude of the electric field to vary along the length of the macro fibers $113_1$-$113_n$.

Referring now to FIGS. 3B and 4B, the smart material forming the macro fiber $113_1$-$113_n$ within the smart material component 111 is a material that expands or contracts when stimulated by an external stimulus such as an electrical signal, electric field, magnetic field, or temperature. In operation, and as discussed in more detail herein, an electric field is applied to the macro fibers $113_1$-$113_n$. The smart material forming the macro fibers $113_1$-$113_n$ expands or contracts in response to the electrical field, depending on the polarity or direction of the electric field. Because the smart material forming the macro fibers $113_1$-$113_n$ is fixed relative to the substrate 102, the macro fibers $113_1$-$113_n$ bends in one direction when the smart material expands and bends in the opposite direction when the smart material contracts. When the field is generated by an oscillating waveform, the field causes the smart material to repeatedly expand and contract and thus the macro fibers $113_1$-$113_n$ and hence the beam 108 to bend back and forth between directions, which in turn causes the cantilevered beam 108 to vibrate. Alternatively, a non-alternating field can be applied to the macro fibers $113_1$-$113_n$ to cause the beam 108 to bend and hold its position, which can be used to provide haptic effects such as a clicking sensation, a virtual detent, a virtual button, and similar non-vibrating haptic effects. This principle applies to embodiments in which the smart material is formed into macro fibers $113_1$-$113_n$ as described herein and to alternative embodiments in which the smart material is formed into structures other than macro fibers.

In an exemplary embodiment, the potential of the electrical signal has a value that generates an electric field strong enough to cause the smart material forming the macro fibers $113_1$-$113_n$ to vibrate the beam 108 at or near the beam's 108 natural or resonant frequency. Vibrating at this frequency causes the beam 108 to experience mechanical resonance and have maximum deflection (relative to vibrating the beam 108 at non-resonant frequencies) in a direction orthogonal to the length of the beam 108. In at least some embodiments, acceleration of the beam's 108 deflection is in the range of about 4 G to about 9 G, although other embodiments may have an acceleration smaller than 4 G or bigger than 9 G. In some embodiments, the beam may have an acceleration in the range of about 100 G or below. As a result, the amplitude of the beam's 108 vibration is greater at mechanical resonance than when the beam 108 vibrates at a non-resonant frequency. In at least some embodiments, the resonant frequency at which the beam vibrates is in the range of about 100 Hz to about 200 Hz, although other embodiment will have a resonant frequency lower than 100 Hz or higher than 200 Hz. In alternative embodiments, the beam 108 vibrates at a non-resonant frequency.

Additionally, the resonant frequency of the beam 108 is higher if the beam 108 is shorter, and the resonance frequency is lower if the beam 108 is longer. As a result, a higher voltage must be applied to the macro fibers $113_1$-$113_n$ for shorter beams 108 in order to increase the amount of deflection. In various embodiments as disclosed herein, physical characteristics of the beam 108 and the base 106 can be adjusted to tune natural frequency and damping of the beam 108. The lower the damping of the beam, the closer the natural frequency will be to the resonant frequency. Physical characteristics of the beam 108 that can be adjusted to include the mass of the beam; the amount of supplemental mass added to the beam, if any; the length, width, and thickness of the beam; the distribution of mass along the length and width of the beam. The material used to fabricate the beam, and the number of layers in the beam. Accordingly, the physical characteristics can be adjusted to decrease the resonant frequency of the beam 108 and enable the use of shorter beams 108. A shorter beam 108 requires less space and enables the design of smaller electronic devices. The haptic actuator 100 also can be tuned to lower the resonant frequency so less voltage is required to cause the beam 108 to bend and deliver a haptic effect. The beam 108 also can be tuned by adjusting physical characteristics other than the length of the beam 108. For example, the thickness of the beam 108 can be adjusted to change the resonant frequency of the beam 108. In another example, the type or composition of the smart material also might change the frequency at which the beam 108 resonates and the smart material can be selected to tune the beam 108. Physical characteristics of the beam 108 also can be adjusted to increase the resonant frequency. The resonant frequency of haptic actuator 100 can be tuned for different reasons such as meeting performance standards for delivering haptic effects; optimizing the length and overall size of the beam 108 for packaging requirements within an electronic device; minimizing power consumption of the haptic actuator 100, or at least fitting power consumption within design specifications; and fitting manufacturing costs within determined budgets.

In at least some embodiments, the beam 108 of the haptic actuator 100 has stiffness in range of about 3200 N/m or less. A stiffness of the structure in this range enables the beam 108 to have a level of vibration that can be felt by a user. Alternative embodiments might have a stiffness in the range of about 800 N/m or more. Another alternative embodiment has stiffness in the range of about 500 N/m to about 4000 N/m, which provides sufficient flexibility to vibrate when electrical stimulation is applied to the macro fibers $113_1$-$113_n$ and has minimal vibration when a device including the haptic actuator 100 is moving and no electrical stimulation is applied to the macro fibers $113_1$-$113_n$.

Additionally, the beam 108 functions as an inertial mass and has a mass large enough that the vibrating beam 108 transmits a level of inertial force to adjacent structures (e.g., housing, touch surface) sufficient to cause them to vibrate at an amplitude that a user can feel. The amount of mass required to create enough inertial force to vibrate proximal structures may vary from application-to-application.

The mass of the beam 108 can be varied to tune vibration of the haptic actuator 100 to deliver a desired haptic effect to a user. The mass of the beam 108 can be varied by changing the dimensions of the beam 108, using different materials or structures to fabricate the smart material component 111, using different materials for the substrate 102, or adding a supplemental inertial mass (not shown) to the beam 108. Additionally, the mass distribution of the beam and the position of any supplemental mass along the length or width of the beam 108 can be adjusted to further tune the haptic actuator 100. The more mass that is distributed away from the base 106 the lower the natural frequency of the beam and the lower the resonant frequency of the beam.

As noted herein, the smart material used to form the macro fibers $113_1$-$113_n$ is a material that converts external stimulus such as an electric field into mechanical motion. When an electric field is applied to the smart material, it causes the molecules in the smart material to either move closer together so the smart material contracts or causes the molecules to move farther apart so the smart material expands. The contracting smart material bends the substrate 102 in one direction and the expanding smart material bends the substrate 102 in the opposite direction. When the haptic drive signal oscillates, the amount of bending changes with the amplitude and polarity of the oscillating signal causing the smart material to expand and contract and the substrate 102 and hence the beam 108 to vibrate or deflect up and down. For some smart material, the direction of bending also may change with the polarity of the haptic drive signal.

In embodiments where the substrate 102 is electrically conductive and operates as an electrode, the smart material fabrication 104 is bonded or otherwise attached to a surface of the substrate 102 using an epoxy, adhesive, or any other suitable technique. In alternative processes for making the haptic actuator 100, the second electrode(s) can be printed onto the surface of the substrate 102 or deposited onto the surface of the substrate 102 using any type of process including patterning, subtractive, additive, and semi-additive processes. Examples include silk screen printing, photoengraving, milling, laser resist ablation, printing, and chemical deposition and etching. The electrode can be formed on the substrate and the smart material component applied over the electrode. Alternatively, the second electrode can be applied to the lower surface of the smart material component 111 using similar techniques instead of forming the electrode on a film and then adhering the film to the smart material component 111. Instead of using a thin film to apply the first electrode to the upper surface of the smart material component 111, the first electrode can be formed and applied to the smart material component 111 using processes that are similar to those described herein with respect to forming and applying the second electrode to either the substrate 102 or the surface of the smart material component 111.

In yet other alternative processes for making the haptic actuator 100 the smart material component can be formed and applied to the substrate 102 using 3D or inkjet printing techniques. When using printing techniques, both the encapsulation and macro fibers can be formed by printing. Alternatively, either just the encapsulation or macro fibers are formed by printing, and other non-printing techniques are used to form the other portions of the smart material component. In some embodiments, the substrate 102 also can be made using printing techniques. The smart material fabrication 104 and substrate 102 can be annealed after printing to increase binding, and to make the beam 108 less brittle and thus more resistant to physical shock.

Other techniques or processes to form the smart material fabrication and the smart material component, and to attach them to the substrate are possible, including thermosetting, electrodeposition, or chemical deposition of the materials onto the substrate 102.

In various embodiments, the smart material component 111 can be coextensive with and cover the entire surface 110 of the substrate 102 or alternatively cover just a portion of the surface 110 of the substrate 102. Additionally, the smart component 111 can have a range of thicknesses. For example, the thickness of the smart material component 111 might be in the range of about 0.5 mm or less. In another example, the thickness of the smart material component 111 can be in the range about 1 mm or more. In yet other examples, the thickness in the range of about 0.1 mm to about 2 mm. Thicknesses in these ranges provide a very thin and durable haptic actuator 100 that is light weight, shock resistant, and durable to survive a drop test of the haptic actuator 100 from a height of at least 1 m.

Additionally, the smart material component 111 has an elastic modulus of about 3200 N/m or less in at least some embodiments, other embodiments might have an elastic modulus in a range of about 800 or more. In other embodiment, the smart material component 111 has an elastic modulus in the range of about 500 N/M and 4000 N/m. The lower the elastic modulus, the less force is required to cause bending of the smart material component 111. Again, the haptic actuator 100 can be tuned to deliver a desired vibration and haptic feedback by adjusting physical characteristics of the haptic actuator such as the type of smart material used to form the macro fibers $113_1$-$113_n$; the material used to encapsulate 101 the macro fibers; the material used to form the substrate; the dimensions of the macro fibers $113_1$-$113_n$; the dimensions of the smart material component 111; and the modulus of the materials in the substrate and smart material component 111, including the macro fibers $113_1$-$113_n$ and the material used to encapsulate 101 the macro fibers $113_1$-$113_n$.

Different types of smart material can be used to form the macro fibers $113_1$-$113_n$. Examples of piezoelectric material that may be useful for haptic benders include piezoelectric ceramics such as barium titanate ($BaTiO_3$) or lead zirconate titanate (PZT). Other examples may include piezoelectric crystals such as trigonal crystallized silica ($SiO_2$), aluminum orthophosphate ($AlPO_4$), or gallium orthophosphate ($GaPO_4$). Other piezoelectric material that are suitable for haptic benders also may be used.

Another example of smart material that can be used to form the macro fibers $113_1$-$113_n$ includes dielectric elastomers such as those based on acrylic, silicon, natural rubbers, and other elastomeric rubbers. Other examples include electroactive polymers (EAP) such as polyvinylidene fluoride (PVDF), homo-polymers, co-polymers such as polylactic acid (PLA) and poly(l-lactic acid) (PLLA), and ter-polymers. Other dielectric elastomers that have a high dielectric constant and a non-plateau stress-strain curve also can be used. Additionally, the smart material can be formed by using a base elastomer and mixing it with an external additive to modify both electrical and mechanical properties of the elastomer. An advantage of these polymers is that they do not contain ceramic, and are more shock resistant and durable than traditional piezoelectric transducers. Additionally, they can be formulated and processed to exhibit a wide range of physical and electrical properties for better control over the responsiveness of the smart material 104 to electrical signals, control over the density and hence weight of the smart material, and control over the shock resistance and durability of the smart material. The formula and processing can be adjusted to optimize these characteristics for different applications and operation in different environments. These smart materials also can be actuated with lower voltages than traditional ceramic-based piezoelectric transducers, and are capable of generating high definition haptic effects.

The substrate 102 is formed with a material that is stiff enough to hold its shape and be cantilevered off a single base or suspended between two or more bases. Likewise, the substrate 102 is flexible enough that the bending action of the macro fibers $113_1$-$113_n$ will cause it to flex with the bending action of the macro fibers $113_1$-$113_n$ and reach its mechanical resonance, which maximizes the inertial force transmitted to surrounding structures. In at least some embodiments, the substrate 102 is flexible enough to vibrate at high frequencies sufficient to deliver an HD haptic effect.

In an example embodiment, the substrate 102 has a thickness in the range of about 1 mm or less. In another example, the substrate 102 has a thickness of about 0.5 mm or more. In yet other examples, the thickness of the substrate 102 is in the range of about 0.5 mm to about 1 mm. Additionally, the substrate 102 has an elastic modulus of about 3200 N/m or less in at least some embodiments. Other embodiments might have an elastic modulus in a range of about 800 or more. In another example, the substrate 102 has an elastic modulus in the range of about 500 N/m and about 4000 N/m. The dimensions, material, and elastic modulus for the substrate 102 can be adjusted to tune the haptic actuator 100 to deliver a desired vibration and haptic feedback. They also can be tuned to adjust the amount of voltage required to be applied to the electrodes in the smart material fabrication 104 to cause the beam 108 to vibrate.

Examples, of materials that can be used to form the substrate 102 include polymers, metals, and composites. Additionally, the substrate 102 can be electrically conductive. If an electrically conductive material is used, the substrate 102 can be connected to ground and operate as a ground plane for the electrical signal that is applied to the substrate 102. Examples of material that can be used to form the substrate include steel; composite materials such as fiberglass or carbon fiber embedded in an epoxy matrix; and engineered plastics such a polyether ether ketone (PEEK), polycarbonate, acrylonitrile, butadiene styrene (ABS). Other materials that have high stiffness and low damping values sufficient for applications disclosed herein also can be used.

In alternative embodiments, the smart material component 111 has sufficient structural integrity, the haptic actuator 100 does not have a separate substrate to support the smart material fabrication 104. In these embodiments, the smart material fabrication 104 forms the beam 108, and the base 106 directly supports the smart material fabrication 104. A separate mass can be added to the smart material fabrication 104 if needed to create enough inertial force to vibrate proximal structures when the beam 108 bends.

The base or support 106 is positioned proximal to an end portion of the beam 108. In at least some embodiments, the base 106 is as close to the edge 114 of the beam 108 as possible to maximize the length of the cantilevered portion of the beam 108 and still provide durability.

The base 106 supporting the beam 108 can have a variety of configurations. In an example embodiment, the portion of the base 106 proximal to the beam 108 has a large enough surface area 116 to connect and support the beam 108, but is small enough that it has minimal damping effect or interference on vibration of the beam 108. In alternative embodiments, the surface area 116 between the base 106 and beam 108 can be adjusted to modify the damping effect of the base 106 has on vibration of the beam 108 to tune the haptic actuator 100.

Additionally, the base 106 has at least some compressibility to enable bending and vibration along the full length of the beam 108. In alternative embodiments, the base 106 is substantially non-compressible. In various embodiments, the compressibility of the beam 108 can be adjusted to further adjust the damping effect the base 106 has on vibration of the beam 108.

The base 106 can have various structures. For example, the base 106 can be hollow or formed with a solid material that has a certain level of compressibility. In alternative embodiment, the base 106 is hollow and formed with a material that is at least partially flexible. The base 106 is then filled with a ferrofluid such as a magnetorheological fluid (MRF). The viscosity of the MRF affects compressibility of the base 106, which affects the magnitude of the beam's 108 bending and its resonant frequency. The ferrofluid can be exposed to a magnetic field to adjust the viscosity of the fluid and thus adjust the amount of bending and resonant frequency of the beam 108. In these embodiments, the haptic actuator 100 can be tuned by adjusting the strength of the magnetic field and thus the viscosity of the ferrofluid.

Figure 5:
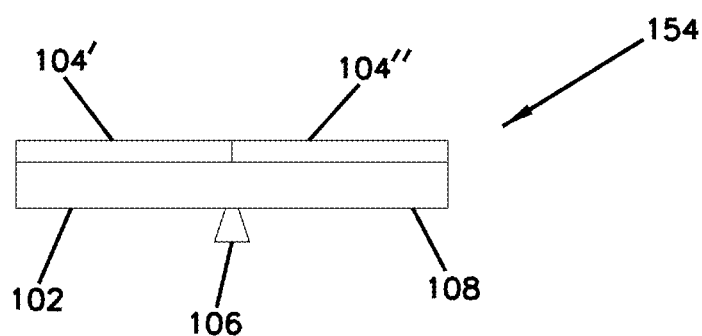
FIG. 5 is a side view of an alternative embodiment of the haptic actuator illustrated in FIGS. 1 and 2.

An alternative embodiment of a haptic actuator is illustrated in FIG. 5. In this embodiment, a haptic actuator 154 is substantially similar to the haptic actuator 100 illustrated in FIGS. 1 and 2. The haptic actuator 154 includes a beam 108 having a substrate 102. It also includes a base 106. In this embodiment, the base 106 is located along the length of the beam 108 so that the beam 108 is cantilevered over oppositely disposed sides of the base 106. A first smart material fabrication 104' is on or proximal to the surface 110 of the substrate 102 along one side of the base 106. A second, separate smart material fabrication 104" is on or proximal to the surface 110 of the substrate 102 along an opposite side of the base 106. The two smart material fabrications 104' and 104" are substantially similar to the smart material fabrication 104, although the structures of the smart material fabrications 104' and 104" can be different from one another in alternative embodiments.

In the illustrated embodiment, the base 106 is proximal to a center portion of the beam 108. In alternative embodiments, however, the base 106 is positioned off center and can be located at any location along the length of the beam 108. In this embodiment, the base 106 can be positioned to provide different haptic effects and to tune the haptic actuator 154 to deliver a desired haptic effect.

Additionally, the macro fibers in the two smart material fabrications 104' and 104" can be stimulated by separate electrical signals having different properties, parameters, or characteristics to create different haptic effects. For example, the electrical signals applied to the two smart material fabrications 104' and 104" can have different amplitudes, frequencies, periods, waveforms, and phases.

Figure 6:
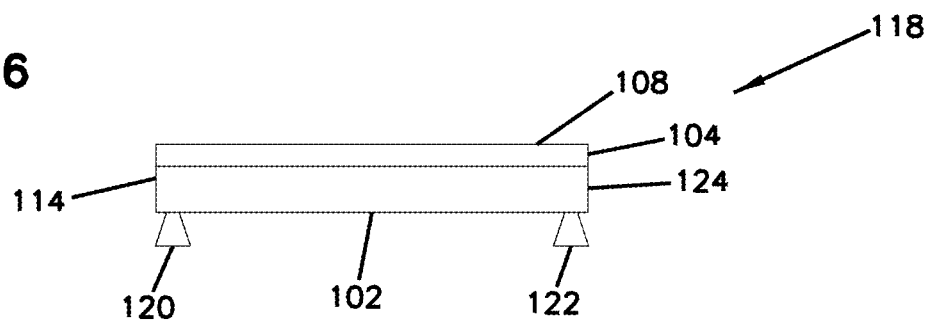
FIG. 6 is a side view of another alternative embodiment of the haptic actuator illustrated in FIGS. 1 and 2.

Another alternative embodiment of a haptic actuator is illustrated in FIG. 6. In this embodiment, a haptic actuator 118 is substantially similar to the haptic actuator 100 illustrated in FIGS. 1 and 2. The haptic actuator 118 includes a beam 108 having a smart material fabrication 104 and a substrate 102.

The haptic actuator has two bases 120 and 122. One base 120 is proximal to one edge 114 of the beam 108 and the other base 122 is proximal to an oppositely disposed edge 124 of the beam 108. In at least some embodiments, the bases 120 and 122 are positioned as close as possible to the edges 114 and 124, respectively, of the beam 108 to maximize the length of the cantilevered portion of the beam 108 and maximize the resonant frequency of the beam 108 and to minimize the damping effect of the bases 120 and 122 have on vibration of the beam 108. In this embodiment, having two bases 120 and 122 will provide more damping to the beam 108 than having just one base as illustrated in FIGS. 1, 2, and 5.

Figure 7:
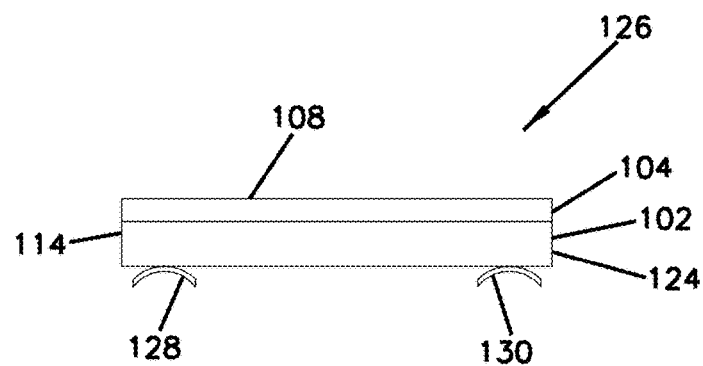
FIG. 7 is a side view of an alternative embodiment of the haptic actuator illustrated in FIG. 6.

Another alternative embodiment of the haptic actuator is illustrated in FIG. 7. In this embodiment, a haptic actuator 126 is substantially similar to the haptic actuator 118 illustrated in FIG. 6. The haptic actuator 126 includes a beam 108 having a smart material 104, a substrate 102, and two bases 128 and 130 positioned proximal to opposite edges 114 and 124, respectively, of the beam 108. In this embodiment, one or either of the bases 128 and 130 is formed with a spring that supports the beam 108.

A spring can have several advantages over a solid base. For example, a spring can absorb shock and increase durability of the haptic actuator 126 if a device housing the actuator 126 is dropped or otherwise receives an impact. Additionally, the spring is compressible, which enables deflection and vibration of the beam 108 to be maximized. Additionally, the dimensions and spring constant of the spring can be adjusted to adjust compressibility of the spring and tune the haptic actuator 126. Different embodiments can use different types of spring. FIG. 7 illustrates leaf springs, but alternative embodiments might include other types of springs in place of or in addition to the illustrated leaf springs.

Figure 8:
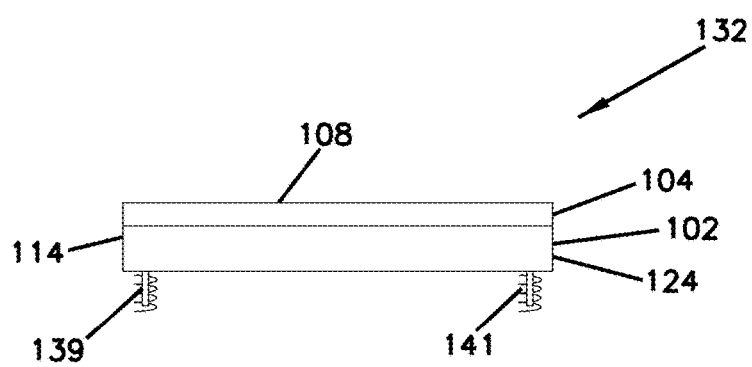
FIG. 8 is a side view of another alternative embodiment of the haptic actuator illustrated in FIG. 6.

Another alternative embodiment of the haptic actuator is illustrated in FIG. 8. In this embodiment, a haptic actuator 132 is substantially similar to the haptic actuator 118 illustrated in FIG. 6. The haptic actuator 132 includes a beam 108 having a smart material 104, a substrate 102, and two bases 139 and 141 positioned proximal to opposite edges 114 and 124, respectively, of the beam 108.

In this embodiment, one or either of the bases 139 and 141 includes a hydraulic cylinder 134 filled with a magnetorheological fluid (MRF). As illustrated in FIGS. 9A and 9B, each hydraulic cylinder 134 has a barrel 138 and a piston 140 positioned within the barrel 138. The barrel 138 also contains an MRF 142. A tie rod 144 extends from an interior cavity of the barrel 138 and has one end 146 operably connected to the piston 140 and an opposite end 148 proximal to and supporting the beam 108. Alternative embodiments can use a suitable ferrofluid other than an MRF.

An electrical conductor is wrapped around the barrel 138 to form an electromagnetic coil 156. When an electrical current flows through the electromagnetic coil 156, it generates a magnetic field that passes through the interior of the barrel 138 and the MRF 142.

An MRF is a fluid that has macro-sized magnetic particles 150 suspended in a medium fluid. The magnetic particles 150 can be selectively polarized by exposing them to a magnetic field. In a non-magnetized state, the magnetic particles 150 are randomly disbursed in the medium fluid. The hydraulic cylinder 134 and its MRF 142 has its greatest level of compressibility in this state and will provide minimal damping to the mechanical vibration of the beam 108.

When the MRF 142 is exposed to a magnetic field, the MRF 142 enters a magnetized state and the magnetic particles 150 develop magnetic dipole moments and become polarized. The polarized particles 150 align themselves in columns 152 in the general direction of the flux lines for the magnetic field. Aligning the magnetic particles 150 increases viscosity of the MRF 142 or makes the MRF 142 less compressible. The greater the viscosity of the MRF 142 the greater the dampening effect the hydraulic cylinder 134 will have against mechanical vibration of the beam 108. As the strength of the magnetic field increases, the dipole moment of the magnetic particles 150 also increases, which in turn increases the attraction between the magnetic particles 150. This increased attraction further increases the viscosity of the MRF 142 and increases the damping effect the hydraulic cylinder 134 has on vibrations of the beam 108. As the strength of the magnetic field decreases, the dipole moment of the magnetic particles 150 also decrease, which in turn decreases the attraction between the magnetic particles 150. This decreased attraction decreases viscosity of the MRF 142 and decreases the damping effect the hydraulic cylinder 134 has on vibrations of the beam 108. In this embodiment, the haptic actuator 132 can be tuned to deliver a desired haptic effect by adjusting the amount of electrical current conducted through the coil 156. The greater the current, the more vicious the MRF 142 and the lower the current the less vicious the MRF 142.

In another alternative embodiment, one or both of the bases 139 and 141 can be solenoids in place of hydraulic cylinders as illustrated. The solenoids operate in a manner similar to a hydraulic cylinder. The solenoids have a housing and a plunger that projects from an interior volume of the housing and engages the substrate 102. The plunger is formed with a ferrous or magnetic material, and a spring is engaged between the plunger and the housing to urge the plunger into the housing. An electromagnetic coil is wrapped around the coil. When the electromagnetic coil is energized is urges the plunger out of the housing and toward the substrate 102. The greater the current flowing through the electromagnetic coil, the greater the magnetic field that it will generate, and the greater the force will be that urges the plunger against the substrate. The plunger dampens vibration of the bender 108 and the greater the force exerted by the plunger against the substrate 102, the greater the damping effect provided by the plunger.

Although the various embodiments and arrangements of the bases described herein are illustrated with a haptic bender having smart material that may be encapsulated, the bases disclosed herein also can be used with traditional haptic benders that use a ceramic-based piezoelectric material that is not encapsulated.

Figure 10:
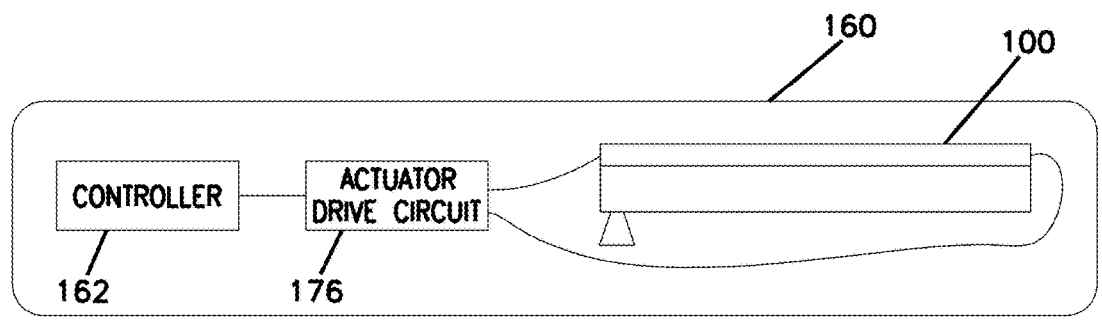
FIG. 10 is a side view of the haptic actuator illustrated in FIGS. 1 and 2 positioned proximal to another structure that the haptic actuator selectively causes to vibrate.

FIG. 10 illustrates an embodiment in which the haptic actuator 100 shown in FIGS. 1 and 2 is positioned proximal to another structure, although alternative embodiments can include any of the haptic actuator embodiments disclosed herein. As the beam 108 of the haptic actuator vibrates, it generates an inertial force that is transferred to the structure 160 proximal to the haptic actuator 100. This transferred inertial force, in turn, causes the proximal structure 160 to also vibrate and deliver a haptic effect. The structure 160 proximal to the haptic actuator 100 that is caused to vibrate can be any structure such as the housing for an electronic device, a touch pad, a display screen, or any other structure with which a user interacts. Examples of electronic devices include computers, tablets, ebook readers, phones such as smart phones, display screens, gaming consoles and controllers, virtual reality goggles and other virtual reality equipment, pointing devices, vehicles, automotive components, surgical instruments and other medical equipment and monitors, exercise equipment, safety equipment, and any other apparatus through which it is desired to deliver a haptic effect.

Figure 11:
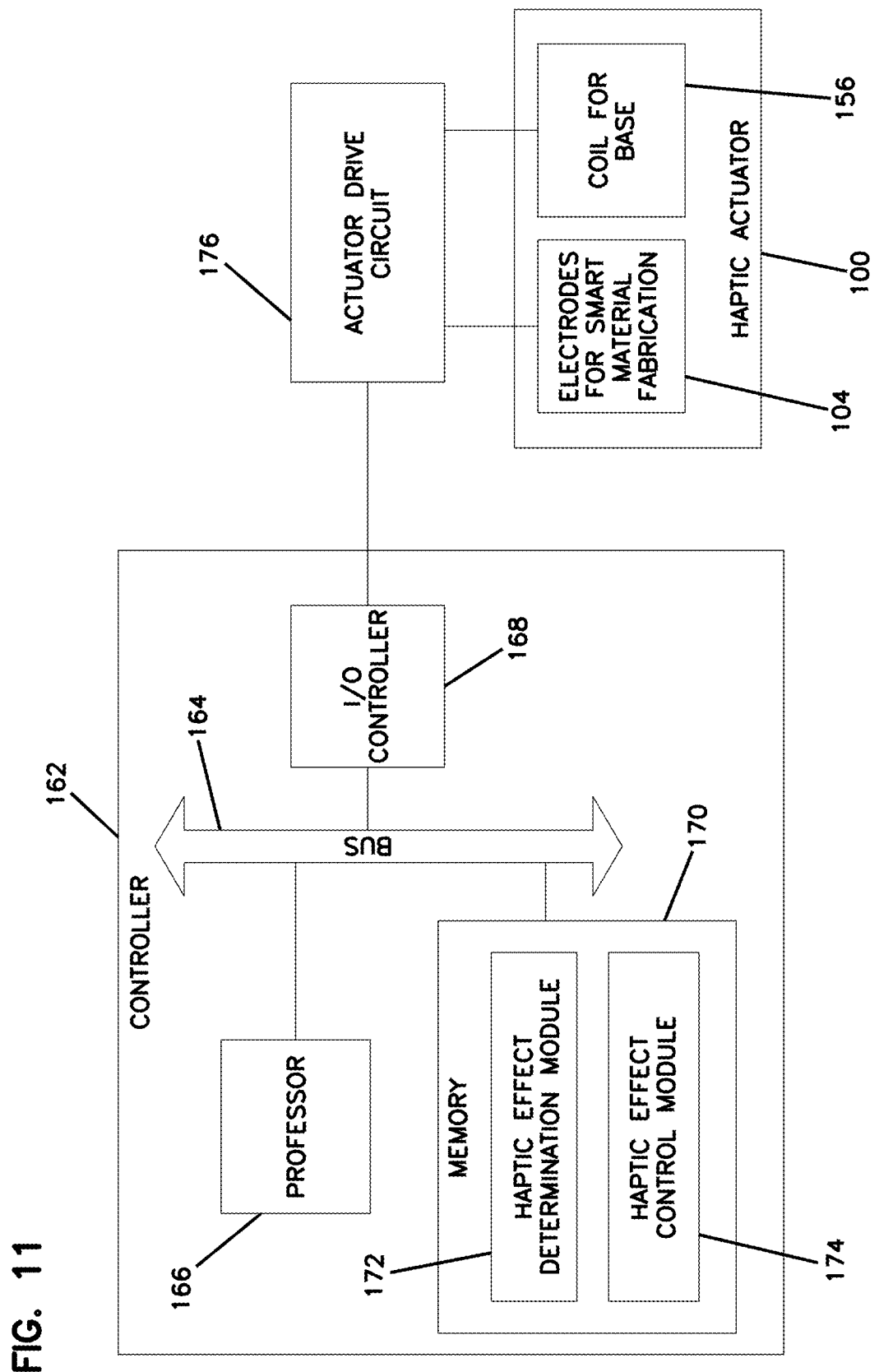
FIG. 11 is a functional block diagram of a controller for controlling operation of the haptic actuators illustrated in FIGS. 1-8.

Referring to FIG. 11, a controller 162 for the haptic actuators disclosed herein includes a bus 164, a processor 166, an input/output (I/O) controller 168 and a memory 170. The bus 164 couples the various components of the controller 162, including the I/O controller 168 and memory 170, to the processor 166. The bus 164 typically comprises a control bus, address bus, and data bus. However, the bus 164 can be any bus or combination of busses suitable to transfer data between components in the controller 162.

The processor 166 can comprise any circuit configured to process information and can include any suitable analog or digital circuit. The processor 166 can also include a programmable circuit that executes instructions. Examples of programmable circuits include microprocessors, microcontrollers, application specific integrated circuits (ASICs), programmable gate arrays (PGAs), field programmable gate arrays (FPGAs), or any other processor or hardware suitable for executing instructions. In the various embodiments, the processor 166 can comprise a single unit, or a combination of two or more units, with the units physically located in a single controller or in separate devices.

The I/O controller 168 comprises circuitry that monitors the operation of the controller 162 and peripheral or external devices. The I/O controller 168 also manages data flow between the controller 162 and peripherals or external devices (not shown). The external devices can reside in the same device in which the controller 162 and haptic actuator are incorporated or can be external to the system. Examples of other peripheral or external devices with which the I/O controller 168 can interface include sensors, external storage devices, monitors, input devices such as keyboards, mice or pushbuttons, external computing devices, mobile devices, transmitters/receivers, and antennas.

The memory 170 can comprise volatile memory such as random access memory (RAM), read only memory (ROM), electrically erasable programmable read only memory (EEPROM), flash memory, magnetic memory, optical memory or any other suitable memory technology. The memory 170 can also comprise a combination of volatile and nonvolatile memory.

The memory 170 is configured to store a number of program modules for execution by the processor 166, including a haptic effect determination module 172 and a haptic effect control module 174. Each program module is a collection of data, routines, objects, calls and other instructions that perform one or more particular task. Although certain program modules are disclosed herein, the various instructions and tasks described for each module can, in various embodiments, be performed by a single program module, a different combination of modules, modules other than those disclosed herein, or modules executed by remote devices that are in communication with the controller 162.

In an example embodiment, the haptic effect determination module 172 determines when to deliver a haptic effect.

If the controller 162 is programmed to deliver different haptic effects, the haptic effect determination module 172 also determines which haptic effect to deliver. An example technique that the haptic effect determination module 172 can use to determine which haptic effect to deliver includes rules programmed to make decisions to select a haptic effect. For example, the controller 162 may interface with GPS receiver or other location tracking device and determine different haptic effects that should be delivered based on the user's location and whether they are moving.

Upon the haptic effect determination module 172 determining which haptic signal to deliver to the haptic actuator 100 and communicates that determination to the haptic effect control module 174. The haptic effect control module 174 obtains the electrical parameters, properties, or characteristics that correspond to the determined haptic effect. The haptic effect control module 174 communicates the electrical parameters to the I/O controller 168, which outputs them to the actuator drive circuit 176. The actuator drive circuit 176 then generates a haptic drive signal embodying the electrical parameters provided by the haptic effect control module 174. The actuator drive circuit 176 applies the haptic drive signal to the electrodes in the smart material fabrication 104 of the haptic actuator 100.

If the haptic actuator includes a tunable base, such as tunable bases 139 and 141 illustrated in FIGS. 8, 9A, and 9B, the haptic effect control module 174 will determine an electrical current to apply to the electromagnetic coils 156 in the bases 139 and 141 to achieve a determined or otherwise desired damping effect. The haptic effect control module 174 will then communicate the electrical parameters defining a signal to apply to the electromagnetic coils 156 in these bases 139 and 141 to the I//O controller 168, which outputs them to the actuator drive circuit 176. The actuator drive circuit 176 generates a damping signal having those parameters and applies that damping signal to the coils 156 in the bases 139 and 141 of the haptic actuator.

Examples of signal parameters that can be used to generate the haptic drive signal include frequency, amplitude, phase, inversion, duration, waveform, attack time, rise time, fade time, and lag or lead time relative to an event. Additionally, examples of signals and waveforms for the haptic drive signal include direct current signals, alternating current signals, square waves, sinusoidal waves, step signals, triangle waves, sawtooth waves, and pulses. Additionally, the haptic drive signal can have voltage in the range from about 60 V to about 100 V. In other embodiments, the haptic drive signal can have a voltage in the range of about 2 kV or less. The frequency of the haptic drive signal can be in the range from about 60 Hz to about 250 Hz. In other embodiments, the frequency of the haptic drive signal can be in the range of about 300 Hz or less. In alternative embodiments, the haptic drive signal has a Voltage or frequency outside of these ranges, Additionally, the desired voltage and frequency of the haptic drive signal can vary depending on the structure of the actuator and the type of smart material used in the actuators.

In an alternative embodiment, there is no determination of the haptic effect to be delivered through the haptic actuator or the electrical parameters to use for generating the haptic drive signal. In such an embodiment, the controller 162 is simply programmed, or even hard wired, to deliver a determined haptic drive signal to the haptic actuator.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A haptic actuator comprising:
   a beam structure that includes a substrate and a smart material component including a plurality of macro fibers; and
   a base that is configured to support or cantilever the beam structure;
   wherein the beam structure vibrates in response to an electrical signal in order to produce one or more haptic effects.

2. The haptic actuator of claim 1, wherein the smart material component is coupled to a pair of electrodes that receive the electrical signal and generate an electric field that is applied to the smart material.

3. The haptic actuator of claim 1, wherein the smart material component is positioned along a bottom surface of the substrate.

4. The haptic actuator of claim 1, wherein the smart material component includes a first smart material component on a first surface of the substrate and a second smart material component disposed on a second surface of the substrate.

5. The haptic actuator of claim 1, wherein the smart material component includes a macro fiber composite (MFC) having a first set of electrodes and a second set of electrodes, the smart material component being positioned between the first set of electrodes and the second set of electrodes.

6. The haptic actuator of claim 1, wherein the plurality of macro fibers run parallel to one another and are arranged to lay on a same plane when in a non-stimulated or relaxed state.

7. The haptic actuator of claim 1, wherein the smart material is selected from a piezoelectric material, an electro active polymer, and/or combinations thereof.

8. The haptic actuator of claim 1, wherein the base is positioned proximal to an end portion of the beam structure and the beam structure forms a cantilever.

9. The haptic actuator of claim 1, wherein the base includes a first base and a second base, and the beam structure forms a bridge extending between the first base and the second base.

10. The haptic actuator of claim 9, wherein at least one of the first base and the second base includes a spring.

11. The haptic actuator of claim 1, wherein the beam structure has an acceleration in a range of about 100 G or below.

12. The haptic actuator of claim 1, wherein the electrical signal has a frequency in a range of about 60 Hz to about 250 Hz.

13. The haptic actuator of claim 1, wherein the beam structure vibrates is in a range of about 100 Hz to about 200 Hz.

14. The haptic actuator of claim 1, wherein the electrical signal has an amplitude in a range of about 60 Volts to 100 Volts.

15. The haptic actuator of claim 1, wherein the haptic actuator has a resonant frequency lower than 100 Hz.

16. The haptic actuator of claim 1, wherein the haptic actuator has a resonant frequency higher than 200 Hz.

17. The haptic actuator of claim 1, wherein the smart material component is formed by applying the smart material to the substrate using three-dimensional printing.

18. The haptic actuator of claim 1, wherein the base includes a smart gel.

19. The haptic actuator of claim 1, wherein the base includes a fluid having a viscosity that selectively changes in response to a magnetic field.

20. The haptic actuator of claim 19, wherein the fluid includes a magnetorheological fluid, a ferrofluid, and/or combinations thereof.

* * * * *